United States Patent
Holthausen (10) Patent No.: US 8,396,851 B2
(45) Date of Patent: Mar. 12, 2013

(54) SCALABLE ASSOCIATIVE TEXT MINING NETWORK AND METHOD

(75) Inventor: Klaus Holthausen, Bocholt (DE)

(73) Assignee: Kinkadee Systems GmbH, Bocholt (DE)

( * ) Notice: Subject to any disclaimer, the term of this patent is extended or adjusted under 35 U.S.C. 154(b) by 82 days.

(21) Appl. No.: 12/734,859

(22) PCT Filed: Nov. 30, 2007

(86) PCT No.: PCT/EP2007/010416
§ 371 (c)(1),
(2), (4) Date: Aug. 2, 2010

(87) PCT Pub. No.: WO2009/068072
PCT Pub. Date: Jun. 4, 2009

(65) Prior Publication Data
US 2011/0208709 A1    Aug. 25, 2011

(51) Int. Cl.
*G06F 7/00* (2006.01)

(52) U.S. Cl. .......................... 707/706; 707/723

(58) Field of Classification Search ............. 707/706, 707/723
See application file for complete search history.

(56) References Cited

U.S. PATENT DOCUMENTS

| | | | |
|---|---|---|---|
| 5,926,811 A | 7/1999 | Miller et al. | |
| 6,725,259 B1 | 4/2004 | Bharat | |
| 7,647,314 B2 * | 1/2010 | Sun et al. | 707/742 |
| 7,735,018 B2 * | 6/2010 | Bakhash | 707/706 |
| 7,797,295 B2 * | 9/2010 | Bell et al. | 707/706 |
| 7,812,986 B2 * | 10/2010 | Graham et al. | 358/1.15 |
| 8,005,831 B2 * | 8/2011 | Hull et al. | 707/731 |
| 8,019,744 B1 * | 9/2011 | Roizen et al. | 707/706 |
| 8,108,389 B2 * | 1/2012 | Bobick et al. | 707/736 |
| 8,112,504 B2 * | 2/2012 | Logan et al. | 709/219 |
| 8,156,100 B2 * | 4/2012 | Dean et al. | 707/706 |
| 8,265,925 B2 * | 9/2012 | Aarskog | 707/706 |
| 8,266,133 B2 * | 9/2012 | Angelo et al. | 707/706 |
| 2003/0212663 A1 | 11/2003 | Leno et al. | |
| 2005/0102251 A1 | 5/2005 | Gillespie | |
| 2010/0138400 A1 * | 6/2010 | Curtis et al. | 707/706 |
| 2011/0055185 A1 * | 3/2011 | Bitan et al. | 707/706 |
| 2011/0161316 A1 * | 6/2011 | Jeh et al. | 707/727 |

OTHER PUBLICATIONS

Sergey Brin and Lawrence Page, The Anatomy of a Large Scale Hypertextual Web Search Engine, Stanford University, 1998, pp. 1-20.*
Sergey Brin et al., "The Anatomy of a Large Scale Hypertextual Web Search Engine," Computer Science Department, Stanford University, pp. 1-29, 1998.*
Weiyi Meng et al., "Building Efficient and Effective Metasearch Engines," ACM Computing Surveys, ACM, Mar. 2002, pp. 48-89.*

(Continued)

*Primary Examiner* — Sherief Badawi
*Assistant Examiner* — Alexandria Bromell
(74) *Attorney, Agent, or Firm* — Marshall & Melhorn, LLC (57) ABSTRACT

A text mining network that improves the performance of search engines by using a network of computer entities with autonomous neural networks. Each neural network provides a weighted list of associated search terms for each search query. The lists of associated search terms from two or more computer entities are merged to a unique list of associated search terms by utilization of a virtual index algorithm. Document result sets from the autonomous entities are merged to a unique result set by a weighted combination of two or more result sets.

9 Claims, 4 Drawing Sheets

OTHER PUBLICATIONS

Sergey Brin et al; The Anatomy of a Large-Scale Hypertextual Web Search Engine; Computer Science Department, Stanford University; pp. 1-29; Stanford, California USA.

Weiyi Meng et al; Building Efficient and Effective Metasearch Engines; ACM Computing Surveys, ACM, New York, NY, USA; vol. 34, No. 1, Mar. 1, 2002, pp. 48-89; XP-0022847.

* cited by examiner

SCALABLE ASSOCIATIVE TEXT MINING NETWORK AND METHOD

BACKGROUND

1. Field of the Invention

The present invention relates generally to systems and methods for computer-based searching.

2. Background of the Invention

Full-text searching of unstructured and semi-structured data is becoming more and more important in the world of computing. The amount of information available through the World Wide Web is voluminous. As of 2006, Google used 2 petabytes of disk space (en.wikipedia.org/wiki/Petabyte). To improve search accuracy of web and desktop searches, efforts have been invested in the improvement of page ranking in terms of relevance. Despite these efforts, however, a large gap still exists between the results returned by a search, and the results desired by a user.

Currently, advanced efforts involve the utilization of a network of computer processors for the calculation of document result sets, which calculation is based on the interconnectivity of documents ("The Anatomy of a large-Scale Hypertextual Web Search Engine"; Sergey Brin et al.; 2000, pp. 1-29). The performance of the system is optimized by re-ranking the results (see U.S. application Ser. No. 10/351,316, filed on Jan. 27, 2003 by Krishna Bharat).

A drawback of this method is that only documents that are frequently cited are found. Thus, relevant information from new or special sources is ignored. For example, a self-help group that provides relevant information on a private home page does not have any "Pagerank" until the home page is cited.

Search routines can also be based on novel approaches in the field of artificial intelligence that utilize so-called artificial neural networks (ANN) in order to provide search results that consider semantic concepts and correlations and/or associations between terms and documents. One drawback of previously known neural network solutions for text mining is that the software only operates on a single computer, and thus is limited to a certain amount of data.

Several ANNs utilize unsupervised clustering algorithms. Unsupervised clustering algorithms fall into hierarchical or partitional paradigms. In general, similarities between all pairs of documents must be determined, thus making these approaches un-scalable.

In order to overcome the above-discussed drawbacks, it is desirable that the document result sets of a search engine be calculated based on the content of websites (and/or documents). Moreover, a need exists for a scalable neural network architecture that allows the generation of neural networks on a scale so that that even petabytes of data can be computed.

Thus, a need remains for additional optimization techniques that use distributed neural networks and virtual indexes.

BRIEF SUMMARY OF THE INVENTION

In one embodiment of the present invention, a text mining system comprises a server device confined to receive search queries from one or more clients and a network of autonomous computer entities each linked to the server and each configured to provide documents and associative queries based on an initial search query. The server is preferably configured to assign relevance scores to the documents based on neural network algorithms that are implemented on each computer entity, assign a virtual index value to each associated query, calculate a merged associative query based an a weighted union of virtual index values received from two or more computer entities, and calculate a document result set based on the weighted union of document result sets from two or more computer entities.

In an embodiment of the present invention, a method for providing to a user a document result set based on a search inquiry, comprises receiving a search request at a server device; forwarding the search request to a plurality of computer devices; receiving, from each computer device, a plurality of associated terms related to the search request, a virtual index value for each associated term; and a weighted relevance of each associated term determined by the each computer device. The method further comprises assigning a document weight factor for each computer device, ranking terms received from the plurality of computer devices based on the document weight factor of each computer device, and providing to the user a ranked set of terms based on the ranking of the terms.

Preferably, the systems and methods of the present invention can be used in combination with a conventional internet search engine such as Google (a product of Google, Inc.) or Yahoo (a product of Yahoo, Inc.) to increase the usefulness of the results of the search procedure.

DETAILED DESCRIPTION OF THE INVENTION

The following detailed description of the invention refers to the accompanying drawings. The detailed description does not limit the invention. Instead, the scope of the invention is defined by the appended claims and equivalents.

Figure 1:
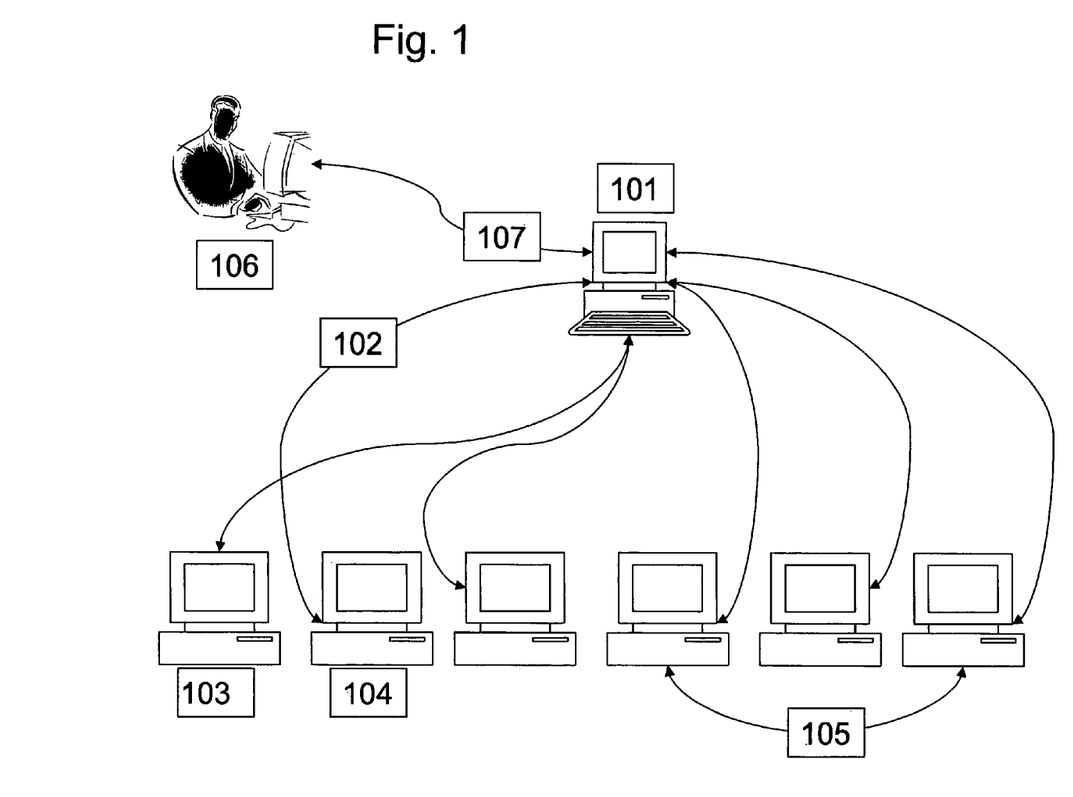
FIG. 1 is a diagram illustrating an exemplary system in which concepts consistent with the present innovation may be implemented.

FIG. 1. is a diagram illustrating an exemplary network system in which concepts/methods/procedures in accordance with the present invention may be implemented. The network system includes multiple computer devices (e.g., 103 and 104), a server device 101, (which can comprise more than one server, but is shown as a single computer for clarity) and external clients 106 (shown, for simplicity as a single computer, but intended to represent more generally a plurality of users that can each send an independent search query) that provide the search queries to the text mining system. Client 106 may be, for example, a PC of an interne user, or a workplace PC of a newspaper archive. Connection 107 is a connection that transfers the search query to the server 101 and provides a result set based on a search query to the user 106.

The computer devices 103, 104 each include a random access memory coupled to a processor (not shown). Each processor performs a neural network algorithm suitable for text mining. An example for a text mining neural network is described in U.S. application Ser. No. 10/141,298, filed on May 8, 2002 by Doug Leno et al. ("Neural Network Feedback For Enhancing Text Search"). A further example is described in U.S. application Ser. No. 10/451,188, filed on Dec. 14, 2001 by David Gillespie ("Method of Document Searching").

Each computer device 103, 104 is assigned a certain document repository. For example, the documents from a newspaper archive could be divided in six parts according to the publication years of the newspaper issues: Part 1: 2000-2007, Part 2: 1990-1999, Part 3: 1980-1989 etc.

Thus, in one implementation of the invention computer device #1 (103) is assigned part1, computer device #2 (104) is assigned Part 2, etc.

Thus, each computer device is an autonomous search engine. Server 101 transfers the search query to the computer devices 103, 104 via network connections (102). The network may be formed based on standard technology as switches or hubs.

In a preferred embodiment of the present invention, each computer device 103,104, etc. provides associated terms for each search query. Associated terms are calculated based on a statistical thesaurus (US-application US1996000616883 filed on Mar. 15, 1996 by David James Miller et al.) or on a neural network algorithm (e.g. Kohonen mapping). For example, the search query "Apollo" could be associated with the following set of results:

Result from computer device #1: Armstrong, Eagle, moon, lunar, spacecraft

Result from computer device #2: Armstrong, Aldrin, Houston, moon, etc.

The first set of results collected from CD#1 results are merged using a virtual index. The second set of results collected from CD#2 are merged using a virtual index, etc.

In our preferred embodiment, the computer devices 103, 104 do not share a common index. For example, the word "moon" may be assigned the number 1767 on the local index of computer device 103 and number 567456 on computer device 104.

Figure 2:
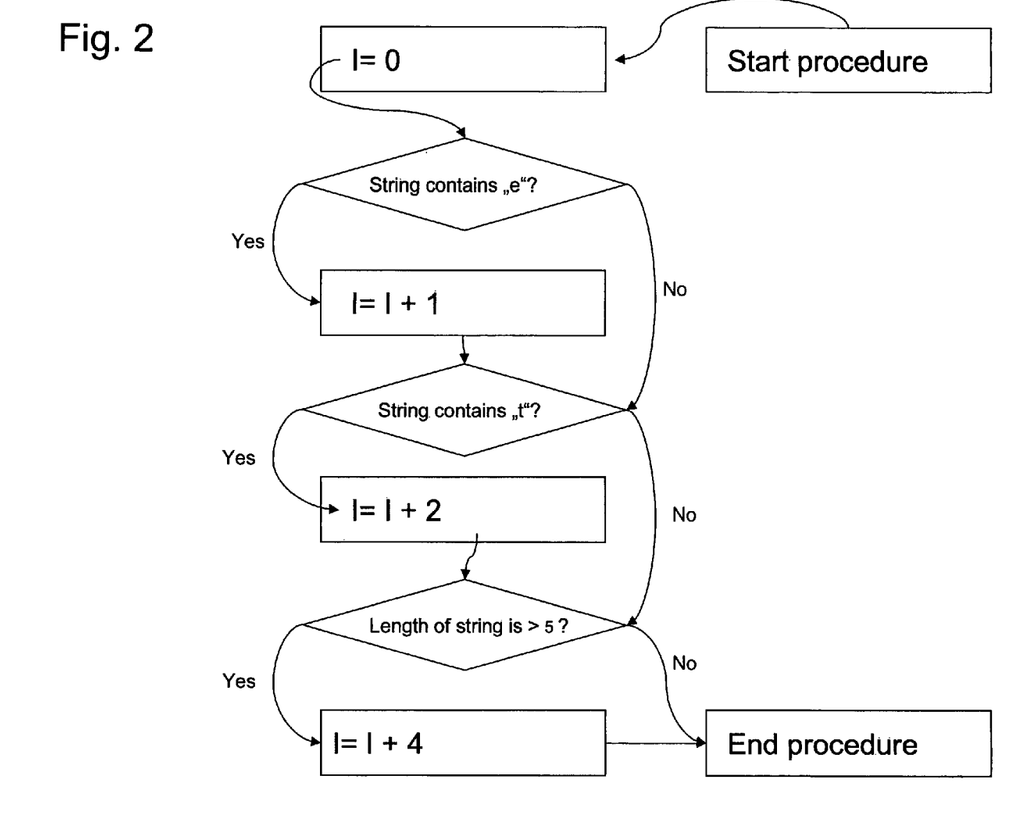
FIG. 2 is a flow chart illustrating an algorithm providing a virtual index.

In order to identify identical words provided by different computer devices, a virtual index is calculated. FIG. 2. is a flow chart illustrating a method that can be performed on a computer or other processing device for providing a virtual index, in accordance with an embodiment of the present invention.

For each word (i.e. string) a set of features to be indexed can be defined. For example, calculation of an index value for words using a three-feature virtual indexing system proceeds according to the steps illustrated in FIG. 2.

In step 202, a word is received by the system, for example, a word search is input by user 106, which is sent to server 101. When a word is received in step 202, a routine, program or algorithm performed by the system, such as server 101, assigns an initial index value (number) (shown in FIG. 2 as "1") of zero to the word.

In step 204, the server determines whether the character "e" is contained in the word. If so, the process moves to step 206, where the current index value (1) is increased by one. If no "e" is present, the process moves to step 208.

In step 208, the system determines whether the letter "t" is contained in the word. If so, the process moves to step 210, where the current index value (current value of 1) is increased by two. If no "t" is present, the process moves to step 212.

In step 212, the system determines whether the length of the word (string) is greater than five. If so, the process moves to step 214, where the current index value (current length) is increased by four. If not, the process moves to the end.

In the example of FIG. 2. a three-Bit-number is assigned to the string. The word "Armstrong" would be assigned the number 6 (0+2+4), the word "Eagle" the number 1 (1+0+0) and the word "moon" would be assigned the number 0.

Typically, under such a scheme, the virtual index number for a given word is not unique. For example, the words "Apollo" and "Aldrin" would be assigned the same index number 4.

In a preferred embodiment of the present invention, a 24-Bit-number for providing a virtual index number to search word is used. Thus, the system performs a check using 24 different features of the string. It can be shown that, based on a German newspaper archive a "nearly" unique virtual index can be defined using the 24-bit-number virtual index.

The advantage of using the virtual index procedure as described above is that the index number can be computed very fast. If the text mining network has to compute a huge amount of data (>1 petabyte), typically millions of different words will aggregate to the local index on each computer device.

In a preferred embodiment of the present invention, each associated term received from each computer device is weighted according to a relevance ranking. This is a typical feature of statistical thesauri or neural networks.

For example, as illustrated below, each computer device provides a list of virtual index id's and weights expressed as a percent, for each term:

Computer device #1:

Associated term #1: "Armstrong" Virtual index 6, relevance 100% (R1,0=1,00)

Associated term #2: "Eagle": Virtual index 1, relevance 80% (R1,4=0,80)

Associated term #3: "moon": Virtual index 0, relevance 50% (R1, 5=0,50) etc.

Computer device #2:

Associated term #1: "Armstrong" Virtual index 6, relevance 100% (R2,0=1,00)

Associated term #2: "Aldrin": Virtual index 4, relevance 92% (R2,6=0,92)

Associated term #3: "Eagle": Virtual index 1, relevance 41% (R2,4=0,41) etc.

In a preferred embodiment of the present invention, server 101 calculates and stores an array of ranking scores for each virtual index entry. Each computer device 103, 104 provides a partial sum of relevance values. Thus, the calculation of the relevance of the resulting associated terms is a simple addition of local result sets, which can be performed very rapidly. Moreover, a seamless and scalable integration of huge amounts of data can be realized.

Relative Ranking of Computer Devices

In a preferred embodiment of the present invention, each computer device can be assigned a relevance value. One example is the value of the information content of the assigned document repository. The information content I is calculated as the logarithm of the Number N of different words that represent the local index of computer device k: $I=\log(Nk)$.

If $Rk,j$ is the relevance of virtual index term j on computer device k, then $$C=\log(Nk)*Rk,j$$

describes the contribution to the overall result set calculated by the server 101.

In one embodiment of the present invention, more than one server 101 is integrated in the network and partial sums can be calculated. Moreover, the relative ranking can be performed by more sophisticated functions f, that utilize the information content I as a parameter $f=f(I)$.

Relative Ranking of Documents

In accordance with embodiments of the present invention, each computer entity is an autonomous search engine. Thus, each computer entity n delivers a list of relevant documents $L_{n,m}$ according to the initial search query. Relevance ranking is usually provided on a percentage scale, i.e. the most relevant document is assigned the relevance 100%.

Figure 3:
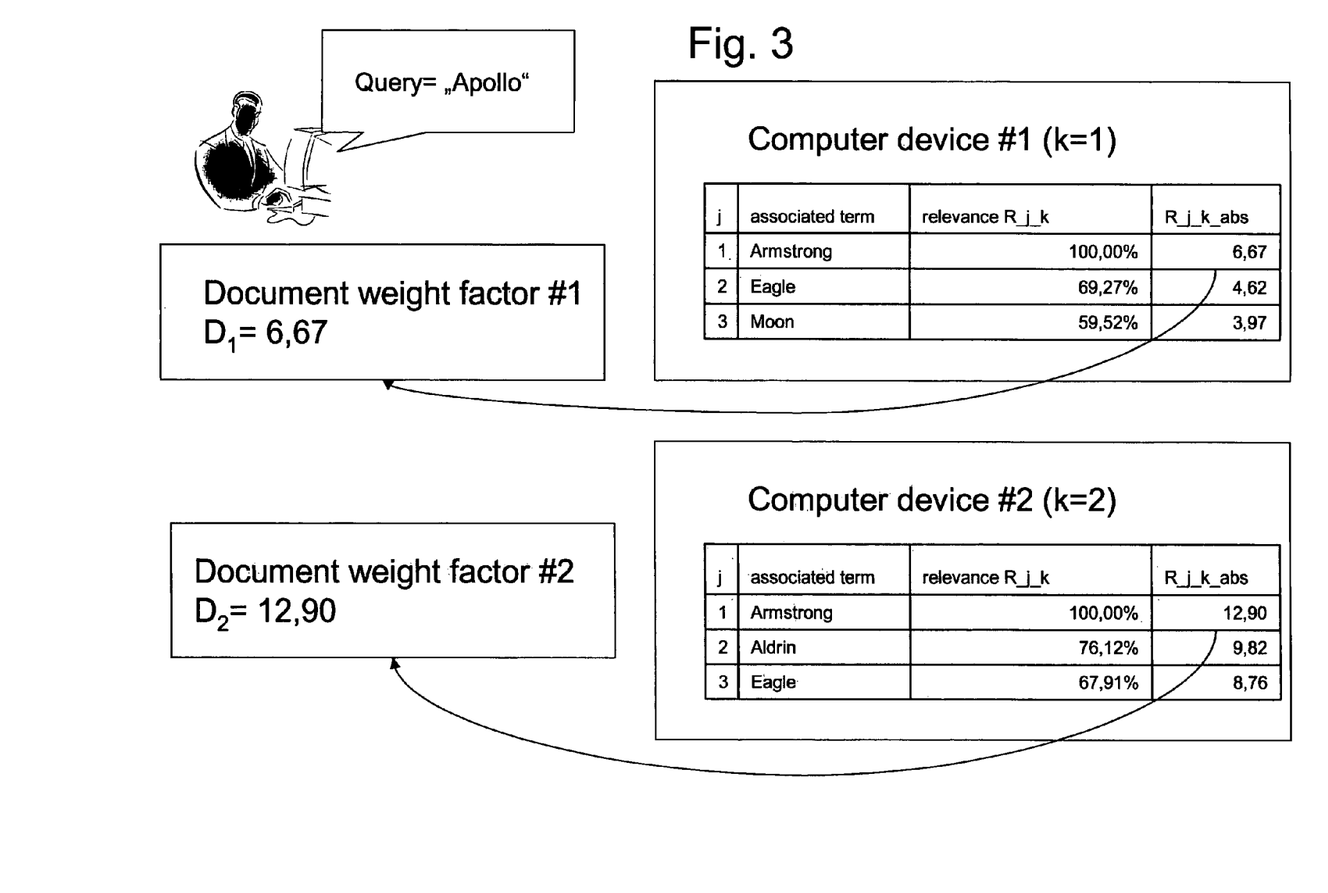
FIG. 3 illustrates the calculation of the document weight factors.

In order to define the relative ranking of documents that are provided by different computer entities, each computer entity n is assigned a document weight factor $D_n$ (FIG. 3).

FIG. 3 illustrates features involved in a process for the computation of document weight factors in accordance with an embodiment of the present invention. The user 300 types the query "Apollo". Two different computers with different document repositories (e.g., 103 and 104 in FIG. 1) deliver different associated terms. Computer device #1 delivers the associated terms "Armstrong", "Eagle" and "moon" with different absolute ($R_{j,k\_abs}$) and relative relevance values. Computer device #2 delivers the associated terms "Armstrong", "Aldrin" and "Eagle".

The document weight factor $D_n$ of computer device n is defined as the maximum absolute value $max(R\_j\_k\_abs)$ of the relevance of associated terms (FIG. 3).

The Re-Ranking is based on the local document set ranking $F_{m,n}$ on a percentage scale for the documents m on computer device n.

$$NewScore(m,n) = D_n * F_{m,n}.$$

In the example of FIG. 3 the most relevant document on computer device #1 will assigned the new ranking score 6,67*1,00=6.67.

Thus, the most relevant document on the entire text mining network has the ranking score given by Maxscore=max(NewScore(m,n)).

Preferably, sorting algorithms of the state of the art can be used to provide a complete sorted list of relevant documents.

In a preferred embodiment of the present invention, documents are stored locally at each computer device that can be addressed via a given IP (Internet Protocol) address. For example, computer device #n may be assigned the internal IP-address 192.168.0.n. The local document m of computer device n can be obtained via TCP/IP (e.g., http://192.168.0.n:PORT/document=m).

A suitable software for this purposes is the Kinkadee® Server provided by Kinkadee® Systems GmbH, Bocholt (Germany).

Principles of Neuronal Preprocessing

An important concept that underpins the scalable associative text mining network of the present invention is neuronal preprocessing, which can be explained using the following examples. The election of the President of the United States and the Vice President of the United States is indirect. Presidential electors are selected on a state by state basis as determined by the laws of each state. All states except Nebraska and Maine use a winner-take-all allocation of electors. From an information-theoretic point of view this process utilizes information reduction in order to enforce a decision making.

A second example regards the associative storage of our brain—the neocortex. The neurons of the neocortex are arranged in structures called neocortical columns. These columns are similar and can be thought of as the basic repeating functional units of the neocortex. In humans, the neocortex consists of about half million of these columns, each of which contains approximately 60,000 neurons.

Figure 4:
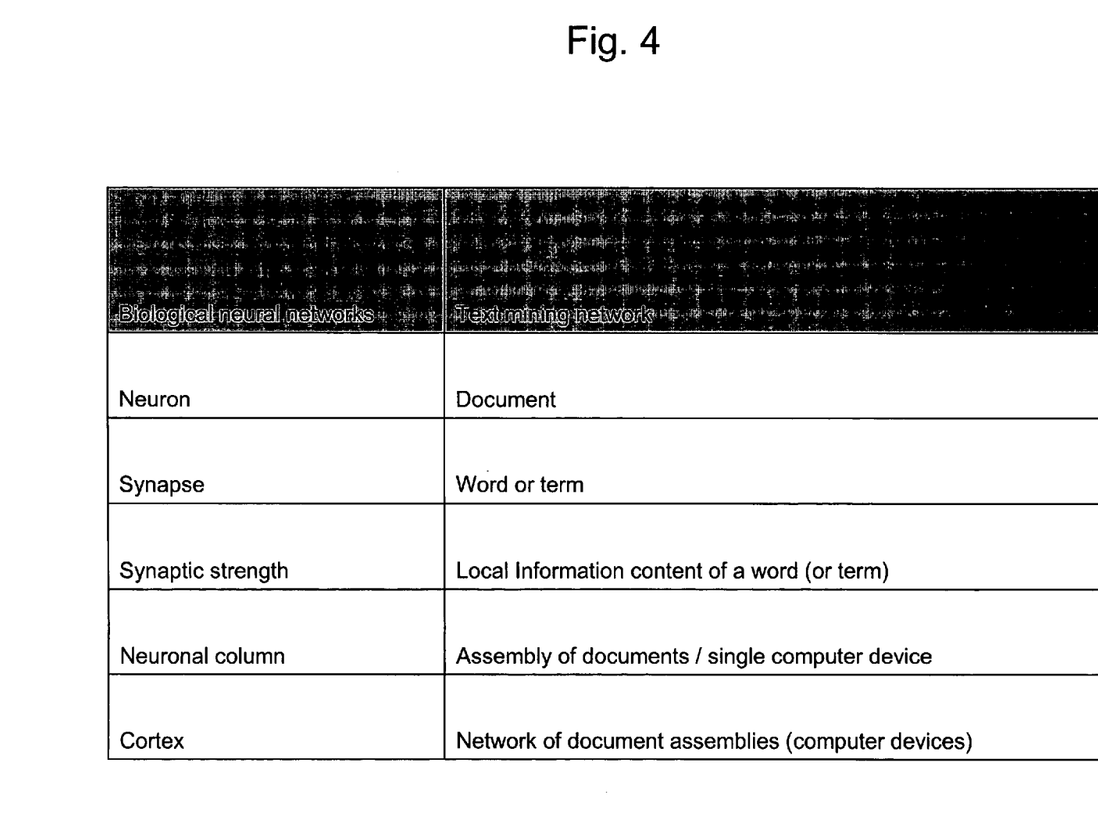
FIG. 4 is a tabular comparison of biological neural networks and the text mining network.

FIG. 4 illustrates the analogy between biological neural networks and the text mining networks. For example, a single computer that stores 60,000 documents represents a cortical column. A network of 100 computers thus stores 6 million documents. Each computing device (i.e. cortical column) operates as an autonomous unit. Given a certain query, each computer utilizes a neural network that computes associated terms.

Typically, a term can be associated with more than 10,000 other terms. These associated terms are represented as vectors. Without the use of any preprocessing, the sum of all vectors has to be calculated. Therefore, each computer has to transfer a huge amount of data. Each associated term is assigned two numerical values: an index value (e.g. the term "Armstrong" is term number 134593) and a weight value (e.g. "Armstrong" has an association value of 0.845 in respect to the search query). In the example of 100 computers therefore approximately 2 million numerical values have to be transferred and calculated. Especially, a global index for the word vectors would be necessary. These considerations illustrate why neural networks have not been applied for internet search engines.

In contrast, embodiments of the present invention, which employ neuronal preprocessing steps, offer advantages in the performance with respect to known neural network schemes. In the preferred embodiment, each computer transfers only the Top-20-associations (20 best associations) for each search query. In the example of a system comprising 100 computers, only 2000 numerical values have to be added. Moreover, the utilization of the virtual index algorithm of the present invention avoids the necessity of using a global index for the text mining network. In fact, in a text mining network of the present invention the total number of unique words remains unknown. Thus, the system and method of the present invention approach is fundamentally different from known state-of-the-art-solutions that utilize algorithms like K-means or SOM, which calculate global word vectors.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing to a user a document result set based on a search inquiry, comprising:
   receiving a search request at a server device;
   forwarding the search request to a plurality of computer devices;
   receiving, from each computer device:
   a plurality of associated terms related to the search request;
   a virtual index value for each associated term; and a weighted relevance of each associated term determined by the each computer device;

assigning a document weight factor for each computer device;

assigning a separate document repository to each computer device of the plurality of computer devices;

assigning a relative ranking of the each computer device according to information content (I) contained in the computer device, wherein the information content (I) of a computer device (k) is given by $I=\log(N_k)$, where N is the number of different words in a local index of computer device k;

ranking terms received from the plurality of computer devices based on the document weight factor of each computer device; and providing to the user a ranked set of terms based on the ranking of the terms, wherein the virtual index is based on a 24-bit number scheme in which 24 different features of each word of a search query are checked.

2. The method of claim 1, wherein the document weight factor is a maximum absolute relevance of any associated term of a given computer device.

3. The method of claim 1, wherein each computer device returns only about 20 best associations to the server entity in response to a search query.

4. The method of claim 1, wherein documents associated with each search term are stored locally in each computer device, and wherein each document can be accessed by the server device at an internet protocol (IP) address associated with the each document.

5. The method of claim 1, wherein providing to the user a ranked set of terms comprises providing a set of search results on a graphical display associated with a user computing device linked to the server device.

6. The method of claim 5, wherein the user computing device is linked to the server device over a data network connection.

7. The method of claim 1, wherein each computing device comprises a microprocessor and random access memory.

8. The method of claim 1, wherein the server device comprises more than one server.

9. The method of claim 1, wherein each computer device is an autonomous search engine.

* * * * *

UNITED STATES PATENT AND TRADEMARK OFFICE
CERTIFICATE OF CORRECTION

PATENT NO. : 8,396,851 B2 Page 1 of 1
APPLICATION NO. : 12/734859
DATED : March 12, 2013
INVENTOR(S) : Klaus Holthausen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 144 days.

Signed and Sealed this
First Day of September, 2015

Michelle K. Lee
*Director of the United States Patent and Trademark Office*